(12) United States Patent
Xue et al.

(10) Patent No.: US 9,879,966 B2
(45) Date of Patent: Jan. 30, 2018

(54) FIXTURE

(71) Applicant: CITIC Dicastal CO., LTD, Qinhuangdao (CN)

(72) Inventors: Bowen Xue, Qinhuangdao (CN); Jiandong Guo, Qinhuangdao (CN); Qi Cang, Qinhuangdao (CN); Xiuwei Wang, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 130 days.

(21) Appl. No.: 15/093,936

(22) Filed: Apr. 8, 2016

(65) Prior Publication Data
US 2016/0313109 A1 Oct. 27, 2016

(30) Foreign Application Priority Data
Apr. 24, 2015 (CN) .......................... 2015 1 0198799

(51) Int. Cl.
*G01B 5/20* (2006.01)
*G01B 5/00* (2006.01)

(52) U.S. Cl.
CPC ......... *G01B 5/0004* (2013.01); *G01B 5/0025* (2013.01)

(58) Field of Classification Search
CPC .................................................. G01B 5/0004
USPC ................................ 33/1 BB, 568, 572, 573
See application file for complete search history.

(56) References Cited

U.S. PATENT DOCUMENTS

| | | | | |
|---|---|---|---|---|
| 4,284,257 A * | 8/1981 | Murkens | ............ | F16M 11/046 248/125.9 |
| 4,604,813 A * | 8/1986 | Kawanami | .......... | G01B 5/0004 33/529 |
| 5,107,599 A * | 4/1992 | Marincic | ............. | G01B 5/0004 269/309 |
| 5,481,811 A * | 1/1996 | Smith | .................... | B23Q 3/103 269/88 |
| 5,735,056 A * | 4/1998 | Gosine | ................ | B23Q 16/004 33/568 |
| 5,883,313 A * | 3/1999 | Ercole | .................. | G01B 5/0004 33/504 |
| 6,263,585 B1 * | 7/2001 | Dickinson | ................ | G01B 3/20 33/542 |
| 6,334,594 B1 * | 1/2002 | Bailey | .................... | F16M 11/24 248/125.1 |
| 2011/0062643 A1 * | 3/2011 | Huber | .................. | G01B 5/0004 269/59 |
| 2013/0318809 A1 * | 12/2013 | Drasovean | ............... | G01B 5/25 33/701 |
| 2016/0354798 A1 * | 12/2016 | Xue | .................... | B05B 13/0285 |
| 2017/0182619 A1 * | 6/2017 | Xue | .......................... | B24B 9/04 |
| 2017/0182620 A1 * | 6/2017 | Xue | .......................... | B24B 9/04 |

* cited by examiner

Primary Examiner — G. Bradley Bennett
(74) Attorney, Agent, or Firm — Maier & Maier, PLLC

(57) ABSTRACT

The present invention discloses a fixture, which is composed of a base plate, a support column, a profiling positioning block, support rods, positioning sleeves and the like. When in use, the fixture provided by the present invention can meet the requirement for performing three-coordinates measuring on a blank and a finished product subjected to machining for a steering knuckle workpiece, and simultaneously has the characteristics of simple structure, low manufacturing cost, convenient use and the like.

3 Claims, 4 Drawing Sheets

FIXTURE

TECHNICAL FIELD

The present invention relates to a fixture, and in particular to a fixture used during three-coordinate measuring on a steering knuckle.

BACKGROUND ART

As an important function part, an automobile steering knuckle product needs to undergo strict dimensional control in a production process no matter for a blank or a finished product subjected to machining, and full-scale measurement using three coordinates is an essential link. According to field technological requirements, sampling inspection needs to be performed frequently, therefore, there is a need for a universal fixture used during three-coordinate measuring for realizing the loading and clamping for both the blank and the finished product subjected to machining. To prevent influences on the measurement, the fixture is strictly restricted in design, and the present invention solves this problem very skillfully and provides a fixture with a very simple structure.

SUMMARY OF THE INVENTION

An object of the present invention is to provide a fixture, which can meet the requirement for performing three-coordinates measuring on a blank and a finished product subjected to machining for a steering knuckle product.

In order to achieve the object described above, a technical solution of the present invention is as follows: a fixture is composed of a base plate, a support column, a dowel, a profiling positioning block, a jacking screw, a left support rod, a left nut, a left regulating column, a right regulating column, a right nut, a right support rod and positioning sleeves, wherein the support column is fixed above the base plate; a positioning projection below the profiling positioning block is matched with a groove in a top end of the support column to realize the front-back positioning for the support column; and the dowel is respectively matched with the support column and the profiling positioning block to realize the left-right positioning of the profiling positioning block; the jacking screw is matched with a threaded hole in a front plate; both the left support rod and the right support rod are fixed at corresponding positions on the base plate; the left regulating column below which the left nut is fixed is connected with the upside of the left support rod; and the right regulating column below which the right nut is fixed is connected with the upside of the right support rod; the outer sides of two positioning sleeves are in interference fit with the base plate, and inner bores are in clearance fit with corresponding positioning pins on a three-coordinate platform.

The profiling positioning block is composed of the positioning projection, the front plate, a plane, a positioning slope, a back plate, a left vertical face, a right vertical face and the like, wherein an included angle A between the plane and the positioning slope is equal to a draft angle of a workpiece; the height H is larger than a height difference B of the workpiece to prevent the workpiece from interferences during loading and clamping; and a crest line formed by crossing between the plane and the left vertical face or the right vertical face is in contact with a side face of a lower support point of the workpiece.

During actual use, the bottom face of the workpiece is matched with the positioning slope of the profiling positioning block; the front face of the workpiece is in contact with the inner side of the back plate to realize the front-back positioning for the workpiece; the crest line formed by crossing between the plane and the left vertical face or the right vertical face is in contact with the side face of a lower support point of the workpiece to realize the left-right positioning for the workpiece; then the jacking screw is used for jacking and fixing the workpiece; and the left regulating column or the right regulating column is regulated in height to support a front end of the workpiece, thereby realizing the loading and clamping of the workpiece.

When in use, the fixture provided by the present invention can meet the requirement for performing three-coordinates measuring on a blank and a finished product subjected to machining for a steering knuckle workpiece, and simultaneously has the characteristics of simple structure, low manufacturing cost, convenient use and the like.

Figure 1:
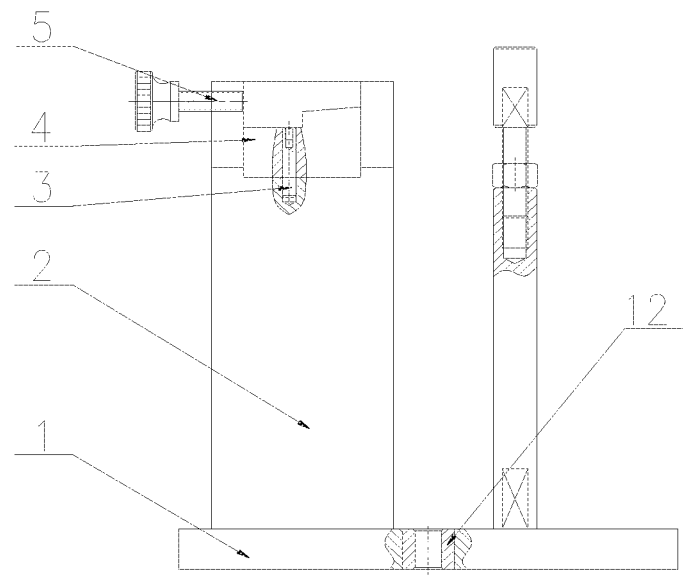
FIG. 1 is a front view of a fixture.
Figure 2:
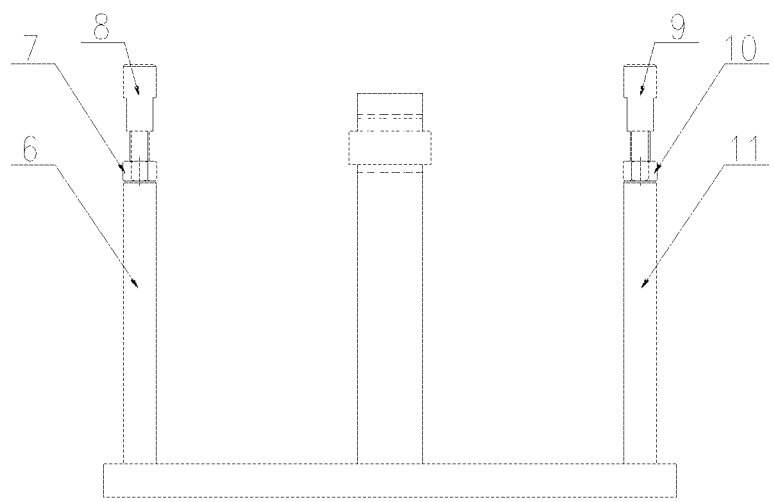
FIG. 2 is a left view of a fixture.
Figure 3:
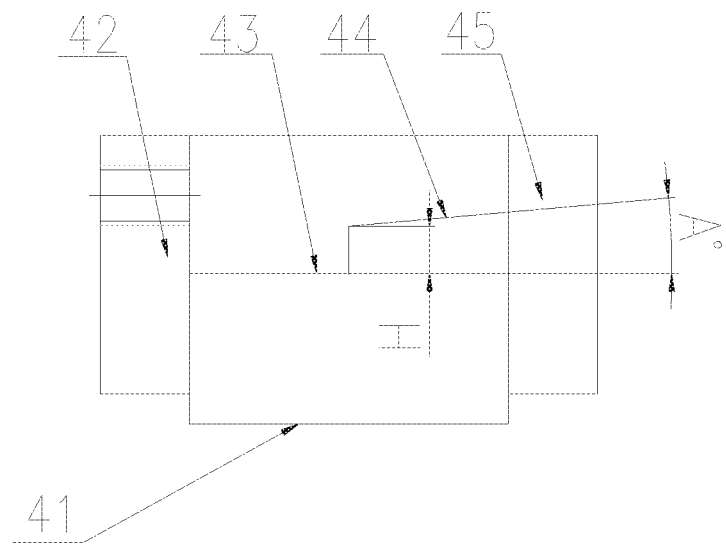
FIG. 3 is a front view of a profiling positioning block of a fixture.
Figure 4:
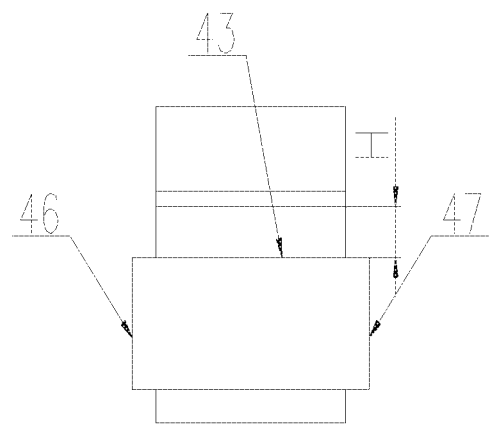
FIG. 4 is a left view of a profiling positioning block of a fixture.
Figure 5:
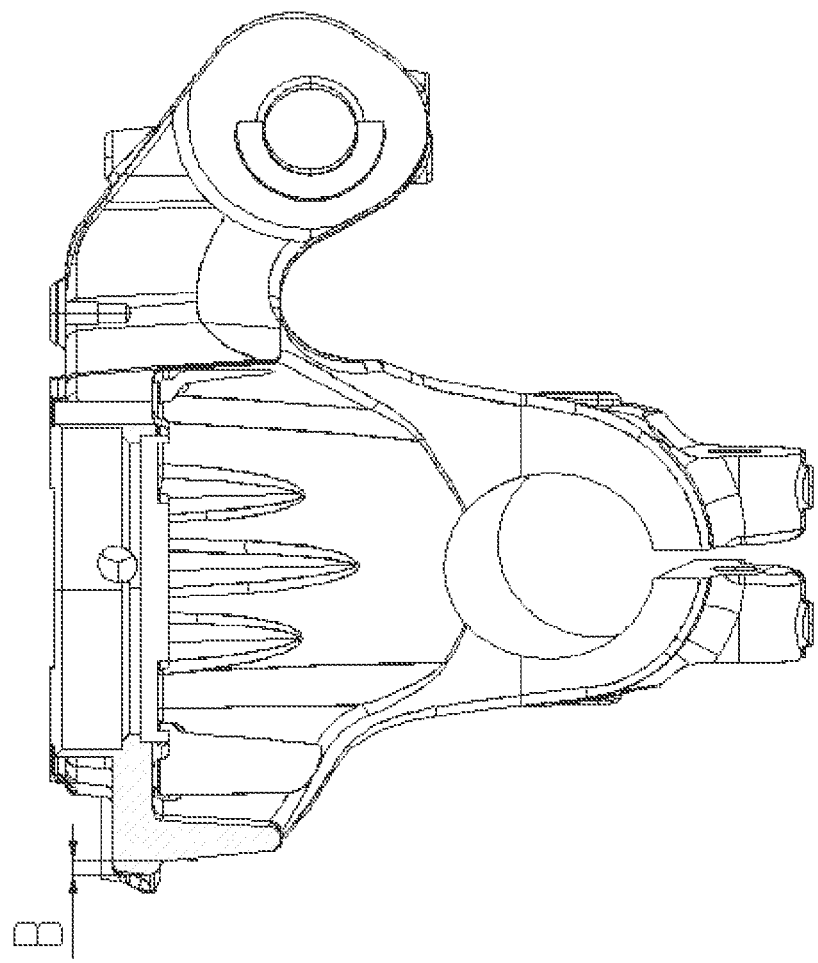
FIG. 5 is a front view of a steering knuckle workpiece.
Figure 6:
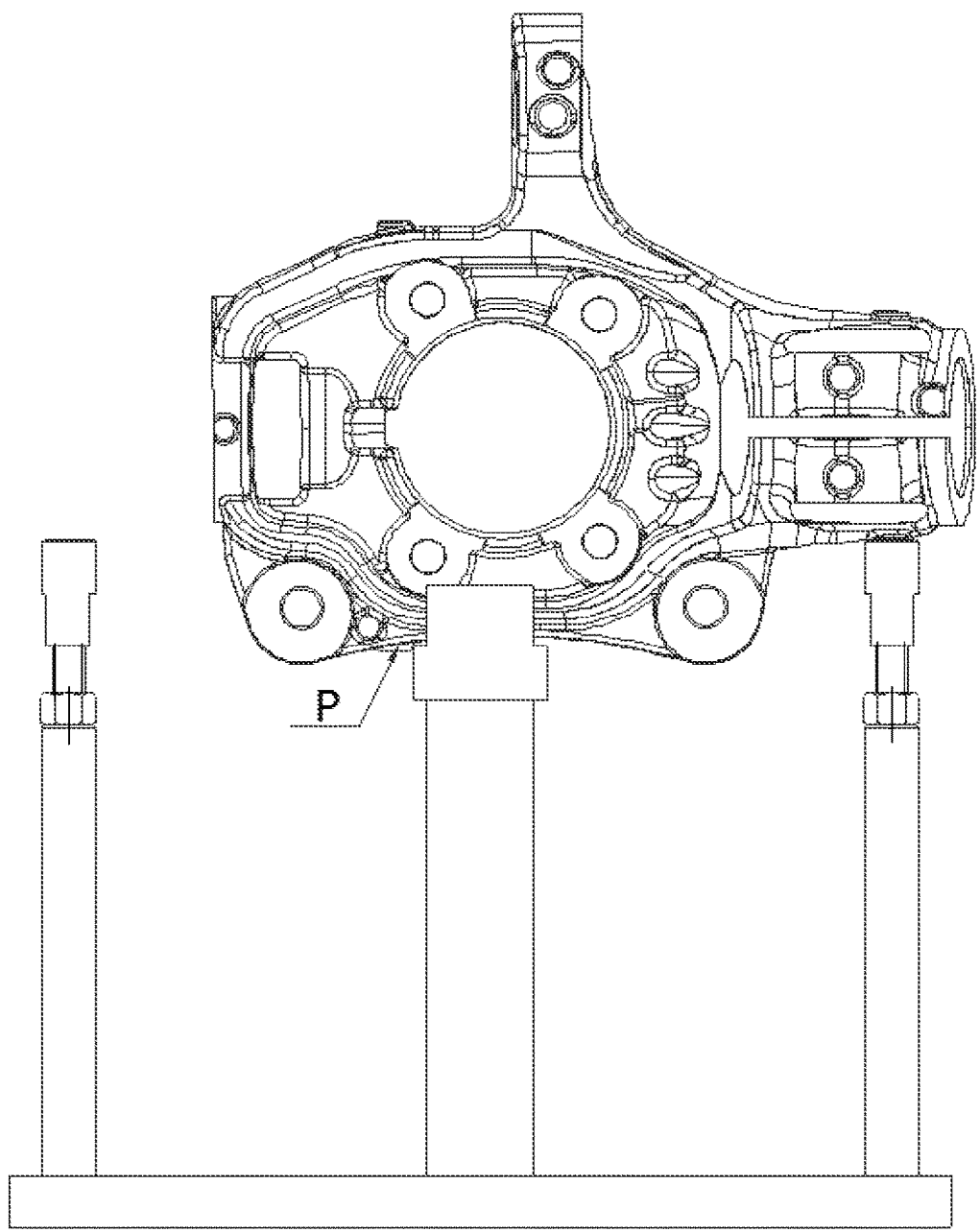
FIG. 6 is a left view of a fixture after loading and clamping.

In the figures, the numeric symbols are as follows: 1—base plate, 2—support column, 3—dowel, 4—profiling positioning block, 5—jacking screw, 6—left support rod, 7—left nut, 8—left regulating column, 9—right regulating column, 10—right nut, 11—right support rod, 12—positioning sleeve, 41—positioning projection, 42—front plate, 43—plane, 44—positioning slope, 45—back plate, 46—left vertical face, 47—right vertical face, P—lower support point, A—included angle between profiling positioning block plane and positioning slope, and H—height difference between plane 43 and positioning slope 44.

DETAILED DESCRIPTION OF THE INVENTION

In the following, the details and working conditions of a specific device provided by the present invention are described in combination with figures.

The fixture is composed of a base plate 1, a support column 2, a dowel 3, a profiling positioning block 4, a jacking screw 5, a left support rod 6, a left nut 7, a left regulating column 8, a right regulating column 9, a right nut 10, a right support rod 11 and positioning sleeves 12, wherein the support column 2 is fixed above the base plate 1; a positioning projection 41 below the profiling positioning block 4 is matched with a groove in a top end of the support column 2 to realize the front-back positioning of the profiling positioning block 4; the dowel 3 is respectively matched with the support column 2 and the profiling positioning block 4 to realize the left-right positioning of the profiling positioning block 4; the jacking screw 5 is matched with a threaded hole in a front plate 45; both the left support rod 6 and the right support rod 11 are fixed at corresponding positions on the base plate 1; the left regulating column 8 below which the left nut 7 is fixed is connected with the upside of the left support rod 6; the right regulating column 9 below which the right nut 10 is fixed is connected with the upside of the right support rod 11; and the outer sides of two positioning sleeves 12 are in interference fit with the base plate 1, and inner bores are in clearance fit with corresponding positioning pins on a three-coordinate platform.

The profiling positioning block 4 comprises the positioning projection 41, the front plate 42, a plane 43, a positioning slope 44, the back plate 45, a left vertical face 46, a right vertical face 47 and the like, wherein an included angle A between the plane 43 and the positioning slope 44 is equal to a draft angle of a workpiece; the height H of the plane 43 and the positioning slope 44 is larger than a height difference B of the workpiece to prevent interferences between the workpiece and the plane 43 during loading and clamping; and a crest line formed by crossing between the plane 43 and the left vertical face 46 or the right vertical face 47 is in contact with a side face of a lower support point P of the workpiece.

In a working process, the bottom face of the workpiece is matched with the positioning slope 44 of the profiling positioning block 4; the front face of the workpiece is in contact with the inner side of the back plate 45 to realize the front-back positioning for the workpiece; the crest line formed by crossing between the plane 43 and the left vertical face 46 or the right vertical face 47 is in contact with the side face of the lower support point of the workpiece to realize the left-right positioning for the workpiece; then the jacking screw 5 is used for jacking and fixing the workpiece; and the left regulating column 8 or the right regulating column 9 is regulated in height to support a front end of the workpiece, thereby realizing the loading and clamping of the workpiece.

The invention claimed is:

1. A fixture, comprising:
a base plate, a support column, a dowel, a profiling positioning block, a jacking screw, a left support rod, a left nut, a left regulating column, a right regulating column, a right nut, a right support rod and positioning sleeves; wherein the support column is fixed above the base plate; a positioning projection below the profiling positioning block is matched with a groove in a top end of the support column; the dowel is respectively matched with the support column and the profiling positioning block to realize the left-right positioning of the profiling positioning block; the jacking screw is matched with a threaded hole in a front plate; both the left support rod and the right support rod are fixed at corresponding positions on the base plate; the left regulating column below which the left nut is fixed is connected with the upside of the left support rod; and the right regulating column below which the right nut is fixed is connected with the upside of the right support rod.

2. The fixture according to claim 1, wherein the outer sides of two positioning sleeves are in an interference fit with the base plate, and the inner bores are in a clearance fit with corresponding positioning pins on a three-coordinate platform.

3. The fixture according to claim 1, wherein the profiling positioning block comprises a positioning projection, a front plate, a plane, a positioning slope, a back plate, a left vertical face, and a right vertical face, an included angle A between the plane and the positioning slope being equal to a draft angle of a workpiece, a height H of the plane and the positioning slope being larger than a height difference B of the workpiece, and a crest line formed by crossing between the plane and the left vertical face or the right vertical face being in contact with a side face of a lower support point of the workpiece.

* * * * *